(12) United States Patent
Raff et al.

(10) Patent No.: US 8,396,809 B1
(45) Date of Patent: Mar. 12, 2013

(54) METHOD FOR REDUCING PURCHASE TIME

(75) Inventors: Christopher Raff, San Francisco, CA (US); Ken Comstock, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 977 days.

(21) Appl. No.: 10/145,535

(22) Filed: May 14, 2002

(51) Int. Cl.
*G06Q 20/00* (2012.01)
(52) U.S. Cl. .............................. 705/65; 705/66; 705/67
(58) Field of Classification Search .................... 705/67, 705/65, 66
See application file for complete search history.

(56) References Cited

U.S. PATENT DOCUMENTS

| | | |
|---|---|---|
| 3,637,994 A | 1/1972 | Ellingboe |
| 3,971,916 A | 7/1976 | Moreno |
| 4,001,550 A | 1/1977 | Schatz |
| 4,004,133 A | 1/1977 | Hannan et al. |
| 4,007,355 A | 2/1977 | Moreno |
| 4,007,443 A | 2/1977 | Bromberg et al. |
| 4,017,848 A | 4/1977 | Tannas, Jr. |
| 4,053,735 A | 10/1977 | Foudos |
| 4,063,083 A | 12/1977 | Cathey et al. |
| 4,090,247 A | 5/1978 | Martin |
| 4,092,524 A | 5/1978 | Moreno |
| 4,115,870 A | 9/1978 | Lowell |
| 4,134,537 A | 1/1979 | Glaser |
| 4,277,837 A | 7/1981 | Stuckert |
| 4,305,059 A | 12/1981 | Benton |
| 4,341,951 A | 7/1982 | Benton |
| 4,415,065 A | 11/1983 | Sandstedt |
| 4,443,027 A | 4/1984 | McNeely et al. |
| 4,454,414 A | 6/1984 | Benton |
| 4,460,965 A | 7/1984 | Trehn et al. |
| 4,482,802 A | 11/1984 | Aizawa et al. |
| 4,501,960 A | 2/1985 | Jouvet et al. |

(Continued)

FOREIGN PATENT DOCUMENTS

| | | |
|---|---|---|
| DE | 3906349 | 9/1990 |
| GB | 1583090 | 1/1981 |

(Continued)

OTHER PUBLICATIONS

MasterCard "*After Three Decades, Our Names is Known Around the World*", http://www.mastercard.com/about/corp/.

(Continued)

*Primary Examiner* — Pierre E Elisca (57) ABSTRACT

For delayed purchases, a purchase token is used to store purchase details on a user device until a user is ready to make a purchase. The purchase token has an expiration date. The purchase token sets a maximum price for a selected item and reserves the selected item until the expiration date. For routine purchases, the user device is preauthorized to complete the purchase. For obvious purchases, a tracking system is used to track the user device and bill the user.

19 Claims, 6 Drawing Sheets

U.S. PATENT DOCUMENTS

| | | | |
|---|---|---|---|
| 4,511,970 A | 4/1985 | Okano et al. | |
| 4,523,297 A | 6/1985 | Ugon et al. | |
| 4,529,870 A | 7/1985 | Chaum | |
| 4,534,012 A | 8/1985 | Yokozawa | |
| 4,536,647 A | 8/1985 | Atalla et al. | |
| 4,542,465 A | 9/1985 | Stockburger et al. | |
| 4,544,833 A | 10/1985 | Ugon | |
| 4,556,958 A | 12/1985 | Ugon | |
| 4,575,621 A | 3/1986 | Dreifus | |
| 4,634,845 A | 1/1987 | Hale et al. | |
| 4,667,087 A | 5/1987 | Quintana | |
| 4,689,478 A | 8/1987 | Hale et al. | |
| 4,697,072 A | 9/1987 | Kawana | |
| 4,697,073 A | 9/1987 | Hara | |
| 4,700,055 A | 10/1987 | Kashkashian, Jr. | |
| 4,720,781 A | 1/1988 | Crossland et al. | |
| 4,736,094 A | 4/1988 | Yoshida | |
| 4,742,215 A | 5/1988 | Daughters et al. | |
| 4,746,788 A | 5/1988 | Kawana | |
| 4,749,982 A | 6/1988 | Rikuna et al. | |
| 4,752,677 A | 6/1988 | Nakano et al. | |
| 4,794,236 A | 12/1988 | Kawana et al. | |
| 4,797,542 A | 1/1989 | Hara | |
| 4,801,787 A | 1/1989 | Suzuki | |
| 4,809,326 A | 2/1989 | Shigenaga | |
| 4,810,862 A | 3/1989 | Nakano et al. | |
| 4,825,052 A | 4/1989 | Chemin et al. | |
| 4,839,504 A | 6/1989 | Nakano | |
| 4,839,506 A | 6/1989 | Homma et al. | |
| 4,855,578 A | 8/1989 | Hirokawa et al. | |
| 4,859,837 A | 8/1989 | Halpern | |
| 4,877,950 A | 10/1989 | Halpern | |
| 4,907,272 A | 3/1990 | Hazard et al. | |
| 4,918,631 A | 4/1990 | Hara et al. | |
| 4,928,001 A | 5/1990 | Masada | |
| 4,941,205 A | 7/1990 | Horst et al. | |
| 4,961,142 A | 10/1990 | Elliott et al. | |
| 5,030,806 A | 7/1991 | Collin | |
| 5,128,997 A | 7/1992 | Pailles et al. | |
| 5,221,838 A | 6/1993 | Gutman et al. | |
| 5,412,192 A | 5/1995 | Hoss | |
| 5,440,109 A | 8/1995 | Hering et al. | |
| 5,590,038 A | 12/1996 | Pitroda | |
| 5,590,197 A | 12/1996 | Chen et al. | |
| 5,621,796 A | 4/1997 | Davis et al. | |
| 5,621,797 A | 4/1997 | Rosen | |
| 5,671,280 A | 9/1997 | Rosen | |
| 5,696,827 A | 12/1997 | Brands | |
| 5,696,902 A | 12/1997 | Leclercq et al. | |
| 5,704,046 A | 12/1997 | Hogan | |
| 5,721,781 A | 2/1998 | Deo et al. | |
| 5,739,512 A | 4/1998 | Tognazzini | |
| 5,742,756 A | 4/1998 | Dillaway et al. | |
| 5,744,787 A | 4/1998 | Teicher | |
| 5,768,385 A | 6/1998 | Simon | |
| 5,770,849 A | 6/1998 | Novis et al. | |
| 5,790,677 A | 8/1998 | Fox et al. | |
| 5,796,831 A | 8/1998 | Paradinas et al. | |
| 5,796,832 A | 8/1998 | Kawan | |
| 5,815,083 A | 9/1998 | Patarin et al. | |
| 5,815,657 A | 9/1998 | Williams et al. | |
| 5,834,756 A | 11/1998 | Gutman et al. | |
| 5,839,119 A | 11/1998 | Krsul et al. | |
| 5,844,218 A | 12/1998 | Kawan et al. | |
| 5,850,442 A | 12/1998 | Muftic | |
| 5,850,446 A | 12/1998 | Berger et al. | |
| 5,857,152 A | 1/1999 | Everett | |
| 5,867,795 A | 2/1999 | Novis et al. | |
| 5,878,138 A | 3/1999 | Yacobi | |
| 5,878,139 A | 3/1999 | Rosen | |
| 5,878,141 A | 3/1999 | Daly et al. | |
| 5,884,271 A | 3/1999 | Pitroda | |
| 5,889,862 A | 3/1999 | Ohta et al. | |
| 5,889,863 A | 3/1999 | Weber | |
| 5,905,976 A | 5/1999 | Mjolsnes et al. | |
| 5,907,832 A | 5/1999 | Pieterse et al. | |
| 5,910,989 A | 6/1999 | Naccache | |
| 5,915,226 A | 6/1999 | Martineau | |
| 5,915,243 A | 6/1999 | Smolen | |
| 5,917,168 A | 6/1999 | Nakamura et al. | |
| 5,943,423 A | 8/1999 | Muftic | |
| 5,943,424 A | 8/1999 | Berger et al. | |
| 5,943,624 A | 8/1999 | Fox et al. | |
| 5,963,924 A | 10/1999 | Williams et al. | |
| 5,974,145 A | 10/1999 | Feiken | |
| 5,982,293 A | 11/1999 | Everett et al. | |
| 5,983,208 A | 11/1999 | Haller et al. | |
| 5,987,132 A | 11/1999 | Rowney | |
| 5,987,438 A | 11/1999 | Nakano et al. | |
| 5,991,412 A | 11/1999 | Wissenburgh et al. | |
| 5,991,749 A | 11/1999 | Morrill, Jr. | |
| 5,992,738 A | 11/1999 | Matsumoto et al. | |
| 5,995,626 A | 11/1999 | Nishioka et al. | |
| 6,003,019 A | 12/1999 | Eaton et al. | |
| 6,003,764 A | 12/1999 | De Rooij et al. | |
| 6,003,767 A | 12/1999 | Hayashida | |
| 6,012,049 A | 1/2000 | Kawan | |
| 6,016,476 A | 1/2000 | Maes et al. | |
| 6,016,484 A | 1/2000 | Williams et al. | |
| 6,016,956 A | 1/2000 | Takami et al. | |
| 6,018,724 A | 1/2000 | Arent | |
| 6,032,857 A | 3/2000 | Kitagawa et al. | |
| 6,038,548 A | 3/2000 | Kamil | |
| 6,038,551 A | 3/2000 | Barlow et al. | |
| 6,058,382 A | 5/2000 | Kasai et al. | |
| 6,059,483 A | 5/2000 | Vannel | |
| 6,065,675 A | 5/2000 | Teicher | |
| 6,073,839 A | 6/2000 | Mori et al. | |
| 6,076,075 A | 6/2000 | Teicher | |
| 6,085,168 A | 7/2000 | Mori et al. | |
| 6,085,976 A | 7/2000 | Sehr | |
| 6,088,797 A | 7/2000 | Rosen | |
| 6,092,147 A | 7/2000 | Levy et al. | |
| 6,101,477 A | 8/2000 | Hohle et al. | |
| 6,102,162 A | 8/2000 | Teicher | |
| 6,105,008 A | 8/2000 | Davis et al. | |
| 6,105,862 A | 8/2000 | Pailles et al. | |
| 6,105,864 A | 8/2000 | Shiobara et al. | |
| 6,112,987 A | 9/2000 | Lambert et al. | |
| 6,115,458 A | 9/2000 | Taskett | |
| 6,116,506 A | 9/2000 | Matsumoto et al. | |
| 6,119,946 A | 9/2000 | Teicher | |
| 6,122,625 A | 9/2000 | Rosen | |
| 6,125,352 A | 9/2000 | Franklin et al. | |
| 6,135,351 A | 10/2000 | Shiobara et al. | |
| 6,142,369 A | 11/2000 | Jonstromer | |
| 6,145,740 A | 11/2000 | Molano et al. | |
| 6,155,484 A | 12/2000 | Sasaki | |
| 6,175,921 B1 | 1/2001 | Rosen | |
| 6,175,922 B1 | 1/2001 | Wang | |
| 6,178,409 B1 | 1/2001 | Weber et al. | |
| 6,182,894 B1 | 2/2001 | Hackett et al. | |
| 6,199,762 B1 | 3/2001 | Hohle | |
| 6,203,330 B1 | 3/2001 | Buchholtz | |
| 6,213,390 B1 | 4/2001 | Oneda | |
| 6,253,999 B1 | 7/2001 | Yamamoto et al. | |
| 6,257,486 B1 | 7/2001 | Teicher et al. | |
| 6,257,487 B1 | 7/2001 | Hayashida | |
| 6,266,653 B1 | 7/2001 | Shiobara et al. | |
| 7,383,206 B2 * | 6/2008 | Rupp et al. | 705/26.3 |
| 2002/0023215 A1 * | 2/2002 | Wang et al. | 713/171 |
| 2002/0091646 A1 * | 7/2002 | Lake et al. | 705/67 |
| 2003/0074259 A1 * | 4/2003 | Slyman et al. | 705/14 |
| 2004/0177003 A1 * | 9/2004 | Liao et al. | 705/14 |

FOREIGN PATENT DOCUMENTS

| | | |
|---|---|---|
| GB | 2201125 A | 8/1988 |
| JP | 54-46434 | 4/1979 |
| JP | 57-182259 | 11/1982 |
| JP | 57-182260 | 11/1982 |
| JP | 59-128664 | 7/1984 |
| JP | 61-237166 | 10/1986 |
| JP | 62-66374 | 3/1987 |
| JP | 62-95660 | 5/1987 |
| JP | 63-240686 | 10/1988 |

| | | |
|---|---|---|
| JP | 64-7285 | 1/1989 |
| JP | 64-64088 | 3/1989 |
| JP | 01-224888 | 9/1989 |
| JP | 59-221691 | 12/1994 |

OTHER PUBLICATIONS

MasterCard "*Frequently Asked Questions*" http://www.mastercard.com/ourcards/smartcard/faq.html.

MasterCard International "*Intractive Demo*" http://www.mastercard.com/ourcard/smartcard/demo1.html.

MasterCard's Chip Strategy "*The Complete Chip Solution*" http://www.mastercard.com/ourcard/smartcard/fact.html.

MasterCard-The Smart Card "*Smart Cards and Electronic Commerce: A Sure Bet for the Banks*" http://www.mastercard.com/ourcard/smartcard/articles/article3.html.

* cited by examiner

Fig. 6

METHOD FOR REDUCING PURCHASE TIME

FIELD

The present invention relates generally to consumer purchases, and more particularly, relates to a method for reducing purchase time using electronic transactions.

BACKGROUND

A typical consumer makes several purchases every week. The purchase may be routine, such as a bus fare to get to work, or more complex, such as the purchase of a new car. The consumer may spend seconds or days making the purchase depending on the item. Regardless of the amount of time spent, the typical consumer would prefer a quick and easy method for making the purchase.

When the consumer finds an item that they are interested in purchasing, the consumer may not want to make the purchase immediately. The consumer may want to do some comparison shopping before making the purchase or delay the purchase until funding is available to make the purchase. This may require the consumer to visit the same store multiple times. It is possible that the price of the item will change between store visits.

When the consumer makes repeated purchases, such as for public transportation, the typical consumer prefers a method of payment that allows for a one-time payment for multiple purchases. For example, a customer that uses public transportation to commute to work may be able to purchase a multiple ride ticket or a monthly ride ticket. For toll roads, a customer may be able to use an electronic transponder that deducts the toll expense from a user account associated with a credit card.

The consumer may make purchases that are obvious based on the location of the consumer. For example, if a consumer goes to the ticket counter at the zoo it is likely that the consumer is there to purchase a ticket to enter the zoo. This may be true of other locations, such as museums, train stations, movies, parking lots, and park entrances.

The typical consumer pays for these purchases using cash or credit cards. Other forms of payment, such as checks, debit cards, and smart cards, may also be used. These methods typically require the consumer to wait in line to make the purchase. Long lines can be frustrating and a method of payment that eliminates the time to make a purchase is beneficial to both the customer and the merchant.

Many consumers carry electronic devices, such as a mobile phone or a personal digital assistant (PDA). The use of the electronic device to make purchases has become an attractive alternative to the use of cash, checks, and credit cards for payment. The electronic device may provide a secured means to make purchases. The electronic device may transmit payment information, such as encrypted credit card account information, to a point-of-sale (POS) terminal. The POS terminal may transmit a digital receipt to the electronic device. This transfer of payment information and digital receipt may be performed remotely.

It would be desirable to use the electronic device to make a delayed purchase based on a previous store or Web page visit or purchase. The information needed to make the purchase may be stored on the electronic device until the consumer is ready to make the purchase. The consumer may return to the store or Web page to make the purchase.

It would be desirable to use the electronic device to make a routine purchase. The electronic device may be preauthorized to make routine purchases, such as public transportation, reducing the amount of time it takes to complete a purchase.

It would also be desirable to use the electronic device to make an obvious purchase. Based on the location of the consumer, the identity of the consumer, and the detection of a point of entry, the purchase may be inferred. The electronic device may pay an entrance fee when it detects the point of entry.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
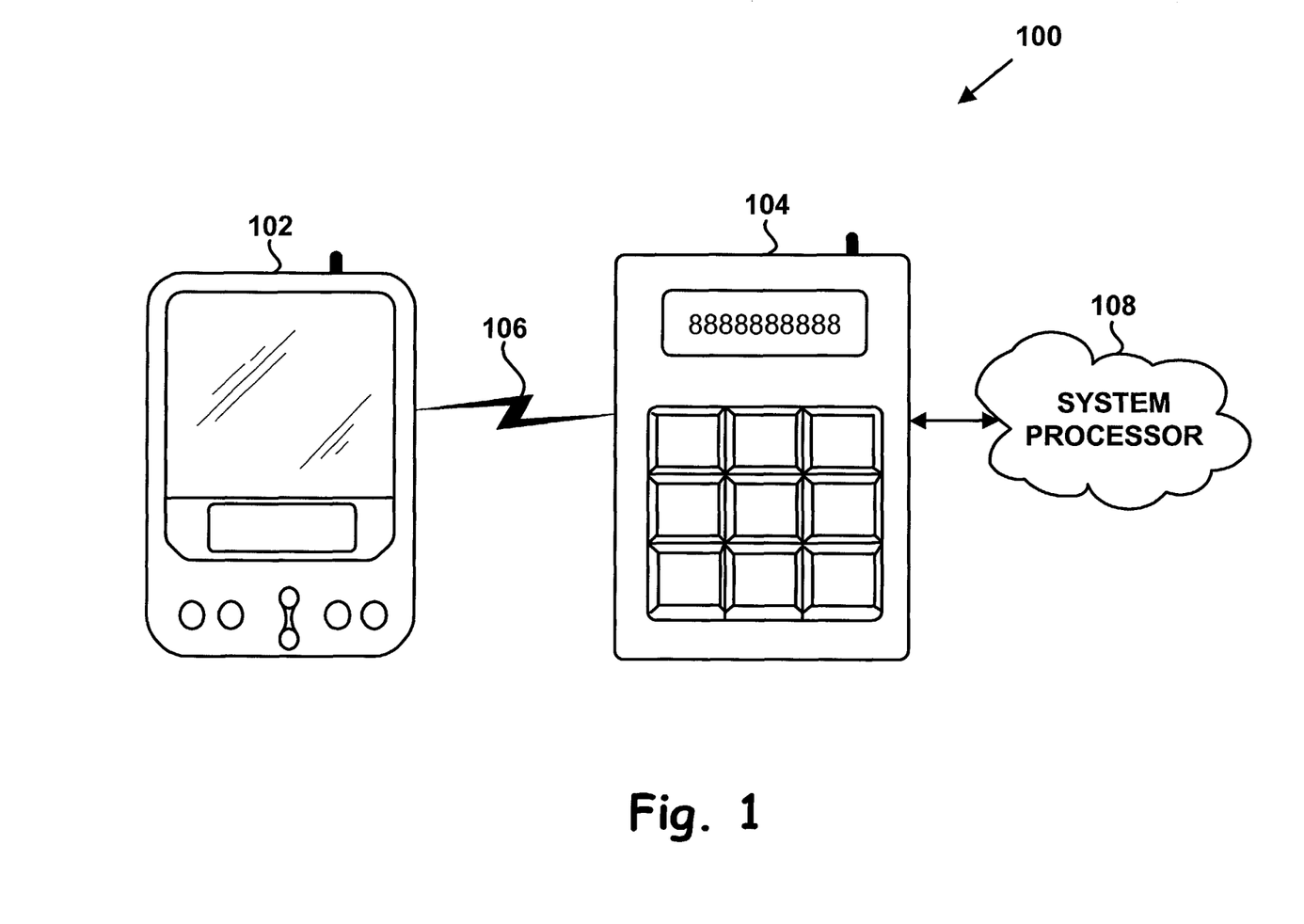
FIG. 1 illustrates a wireless electronic system, according to an exemplary embodiment.

FIG. 1 shows a wireless electronic system 100 used for making electronic transactions. While a wireless electronic system 100 is shown, a wireless electronic system may not be required for all electronic transactions described below. The wireless electronic system 100 includes a user device 102 and a payment device 104. The user device 102 and the payment device 104 may communicate using a wireless network 106.

The user device 102 may be any device that is capable of transmitting and receiving information over the wireless network 106. In a preferred embodiment, the user device 102 is a personal digital assistant (PDA). However other devices, such as a mobile phone, a pager, or a handheld device, may also be used. The user device 102 may include a subsystem that allows the user device 102 to access the wireless network 106. For example, the subsystem may be an antenna, an infrared interface, or an optical interface. The user device 102 may also include an electronic display. The electronic display may be capable of displaying text and/or graphics. The user device 102 may also include a keyboard, touch-screen display, phone pad, or other mechanism that may allow the user to enter a series of letters, numbers, and/or other typographical symbols into or onto the user device 102.

The user device 102 may be capable of transmitting payment information to the payment device 104 and receiving a digital receipt from the payment device 104. The payment information may include account information needed to perform and complete a purchase. For example, the payment information may include, but is not limited to, user identification and billing address, service institution identification (Visa, MasterCard, bank), account number, expiration date, and credit limit. The digital receipt may include similar information as included on a paper receipt. For example, the digital receipt may include, but is not limited to, store information (location, store number, invoice number, cashier identification), item(s) purchased, amount of purchase (subtotal, tax, total), date and time of purchase, and account used to pay for the purchase.

The payment device 104 may be any device that is capable of providing electronic payment services. The payment device 104 may receive payment information from the user device 102, authorize the payment, and transfer the digital receipt. In a preferred embodiment, the payment device 104 is a point-of-sale (POS) terminal, such as a VeriFone POS payment terminal. However, other payment devices may also be used. The payment device 104 may include a subsystem that allows the payment device 104 to access the wireless network 106. For example, the subsystem may be an antenna, an infrared interface, or an optical interface. The payment device 104 may also include an electronic display. The electronic display may be capable of displaying text and/or graphics. The payment device 104 may also include a keypad.

The payment device 104 may be able to communicate with a system processor 108. The system processor 108 may be used to verify account information with the service institution for validity and credit limits. The system processor 108 may then pass a message that either accepts or declines the transaction to the payment device 104. Upon acceptance, the payment device 104 may transfer the digital receipt to the user device 102. The payment device 104 and the system processor 108 may communicate using any physical and/or wireless network.

The wireless network 106 may be used to transfer payment information and the digital receipt between the user device 102 and the payment device 104. The wireless network 106 may allow the user device 102 and the payment device 104 to communicate remotely. The wireless network 106 may allow communication to occur over an appropriate electromagnetic frequency range. In addition, the wireless network 106 may allow information to be transmitted and received using infrared or optical interfaces.

Delayed Purchase

Figure 2:
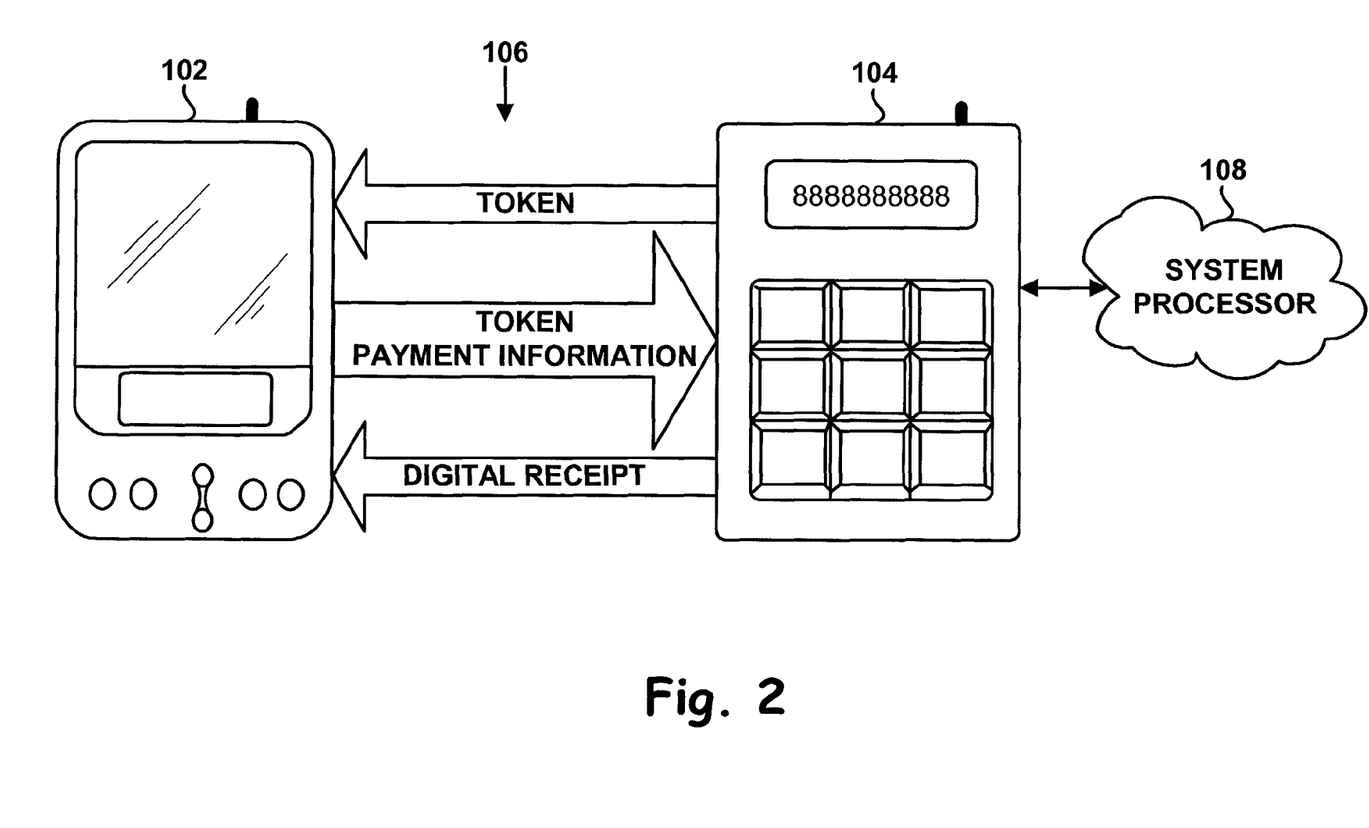
FIG. 2 illustrates a communication flow of the wireless electronic system depicted in FIG. 1, according to a first embodiment.

FIG. 2 illustrates a general communication flow of the wireless electronic system 100 as shown in FIG. 1 for a delayed purchase. Additional communication may occur between the user device 102 and the payment device 104 that is not depicted in FIG. 2. For this example, assume that a user has selected an item to purchase; however, the user is not ready to make the purchase at this time. The user may want to delay the purchase to evaluate other merchandise, to obtain the necessary funding, or for any other reason. The user may decide at a later time not to make the purchase.

The user presents his or her user device 102 and the selected item to a merchant. Alternatively, the user describes the selected item to the merchant instead of bringing the selected item to the merchant. The merchant has a payment device 104. Upon presentation, the user device 102 may negotiate and set up a secure wireless network 106 with the payment device 104. When the wireless network 106 has been setup, the payment device 104 may transfer a purchase token to the user device 102. Once the purchase token has been transferred to the user device 102, the user device 102 may store the purchase token in memory for future redemption. The user device 102 may store the purchase token in a secured location. When the transfer is complete, either the user device 102 or the payment device 104 may terminate communication over the wireless network 106.

In an alternative embodiment, the user selects the item to purchase from a Web page. The purchase token may be transferred from the Web page to the user device 102. The user device 102 may be operable to receive the purchase token from the Web page. In this embodiment, the wireless electronic system 100 may not be necessary to transfer the purchase token. For example, the user device 102 may be located in a docking cradle connected to a computer. The purchase token received from the Web page may be stored in memory on the user device 102.

In another embodiment, the purchase token may be obtained using information from a previous purchase. The details regarding the previous purchase may be stored on the user device 102. The user device 102 may be able to obtain a purchase token using information from a previous purchase from either the payment device 104 or the Web page. If the price has changed since the last purchase, the purchase token may reflect the new price.

The purchase token may include purchase details needed to complete the purchase at a future time. The purchase details may be similar to those found on a typical paper receipt or a merchandise order form. For example, the purchase details may include, but are not limited to, item description, item price, and store information.

In addition, the purchase token may contain an expiration date. The purchase token may set a maximum price for the selected item until the expiration date of the purchase token. If the price decreases before the purchase token is redeemed, the user may receive the benefit of the lower price. However, if the price increases before the purchase token is redeemed, the user may receive the benefit of the price specified on the purchase token.

The user may choose not to redeem the token. If the user tries to redeem the purchase token after the expiration date, the merchant may reject the purchase token. However, the merchant may choose to honor the expired purchase token. The purchase token may also reserve the selected item until the expiration date of the purchase token.

The merchant may receive credit for the transfer of the purchase token. The credit may be in the form of a commission, a sales quota credit, or any other sales credit. The credit may be obtained whether or not the purchase token is redeemed to purchase the selected item at a future date based on the merchant's sales policy.

The purchase token may include a means for authentication. For example, the merchant may provide an electronic signature on the purchase token. A public/private key encryption system may be employed to validate the purchase token. If the merchant determines that the purchase token has been altered after the token has been transferred to the user device 102, the merchant may reject the purchase token. Alternatively, some purchase details may be altered, such as the color or quantity of the item. The merchant may determine what purchase details on the purchase token may be altered while the token is stored on the user device 102.

If the user has decided to redeem the purchase token, the user may go to a store or a Web page. The merchant may receive credit for the sale even if the user chooses to go to another store or to use the Web page to make the purchase, rather than returning to the store in which the purchase token was obtained.

The user device 102 may negotiate and set up a secure wireless network 106 with the payment device 104. The user device 102 may transfer the purchase token to the payment device 104 over the wireless network 106. Alternatively, the user device 102 may transfer the purchase token to the Web page. By transferring the purchase token to the payment device 104 or the Web page, the user may reduce purchase time by not having to remember and/or complete the purchase details more than once. The payment device 104 or Web page may authenticate the purchase token and check the expiration date.

In addition, the user device 102 may transfer payment information to the payment device 104 or Web page. The payment information may include account information needed to perform and complete the purchase. For example, the payment information may include, but is not limited to, user identification and billing address, service institution identification (Visa, MasterCard, bank), account number, expiration date, and credit limit.

If the purchase token is valid, the payment device 104 may forward some or all of the payment information to the system processor 108. The system processor 108 may verify the payment information. The system processor 108 may then provide the payment device 104 with a message that indicates whether or not the purchase is authorized. Alternatively, the payment device 104 may be capable of authorizing the purchase without the use of the system processor 108.

If the purchase is authorized, the payment device 104 or Web page may send the user device 102 the digital receipt indicating that the transaction is complete. When the transaction is complete, either the user device 102 or the payment device 104 may terminate communication over the wireless network 106. This process of exchanging payment information for a digital receipt is described in U.S. patent application Ser. No. 10/055,610, titled "System and Method for Use in a Wireless Electronic Transaction," which is assigned to the same assignee as the present invention and is fully incorporated herein by reference.

The user may reduce the purchase time by not having to remember and/or complete the purchase details more than once. In addition, the purchase time may be reduced by not having to revisit the store in which the purchase token was obtained. The user may also benefit by being able to reserve the item at a specified maximum price.

The merchant may benefit from the use of the purchase token by receiving credit for the sale even if the eventual purchase does not occur in his or her store. The merchant may also be able to obtain user information during the transfer of the purchase token. The user information may be used to provide statistical information regarding what type of consumer may be interested in purchasing what type of product. The statistical information may also be used to determine what kinds of goods and how many goods the merchant should stock.

Figure 3:
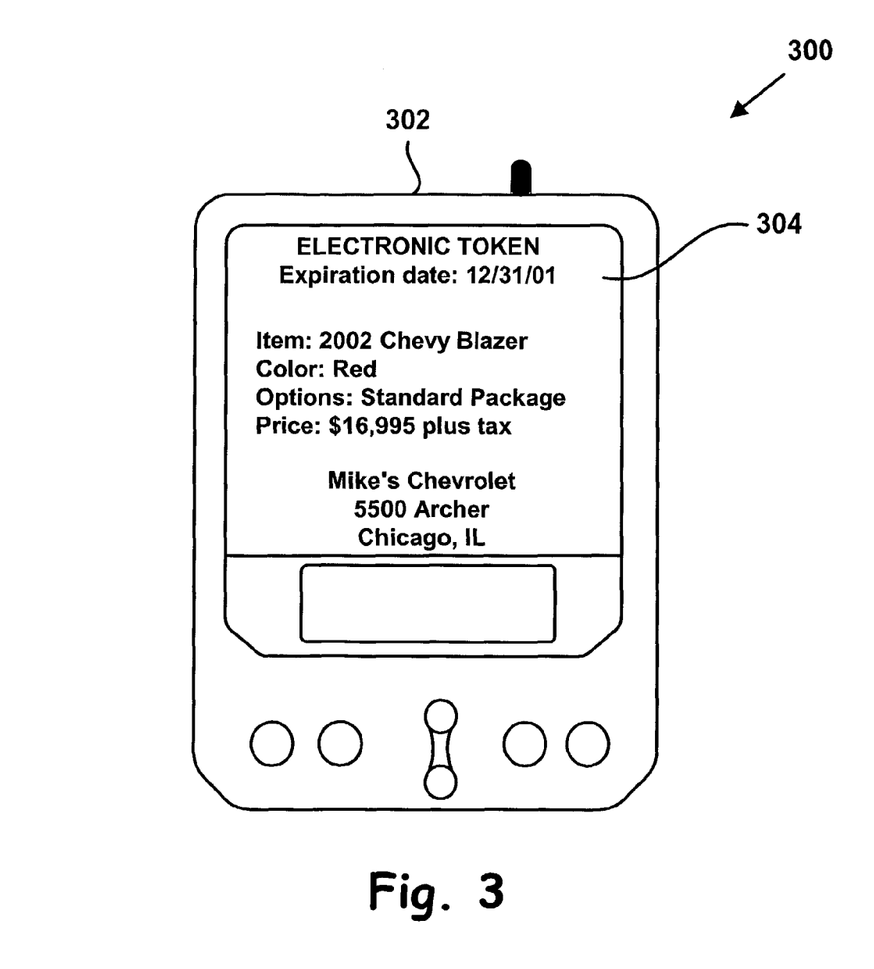
FIG. 3 illustrates a screen shot of a purchase token, according to a first embodiment.

FIG. 3 illustrates a screen shot 300 of a purchase token. The screen shot 300 may be displayed on a user device 302. The user device 302 may be substantially the same as the user device 102 of the wireless electronic system 100. A purchase token 304 may be located on the display of the user device 302. The purchase token 304 depicted on the screen shot 300 is provided as an example only.

The purchase token 304 may include text and/or graphics that communicate the purchase details. Other information may also be included on the purchase token. For example, the user may be able to click on "2002 Chevy Blazer" and more details regarding the vehicle may be displayed. The purchase token 304 may include an expiration date. The purchase token 304 may be stored in memory on the user device 302 and retrieved to review the purchase details or to redeem the purchase token.

Routine Purchase

Figure 4:
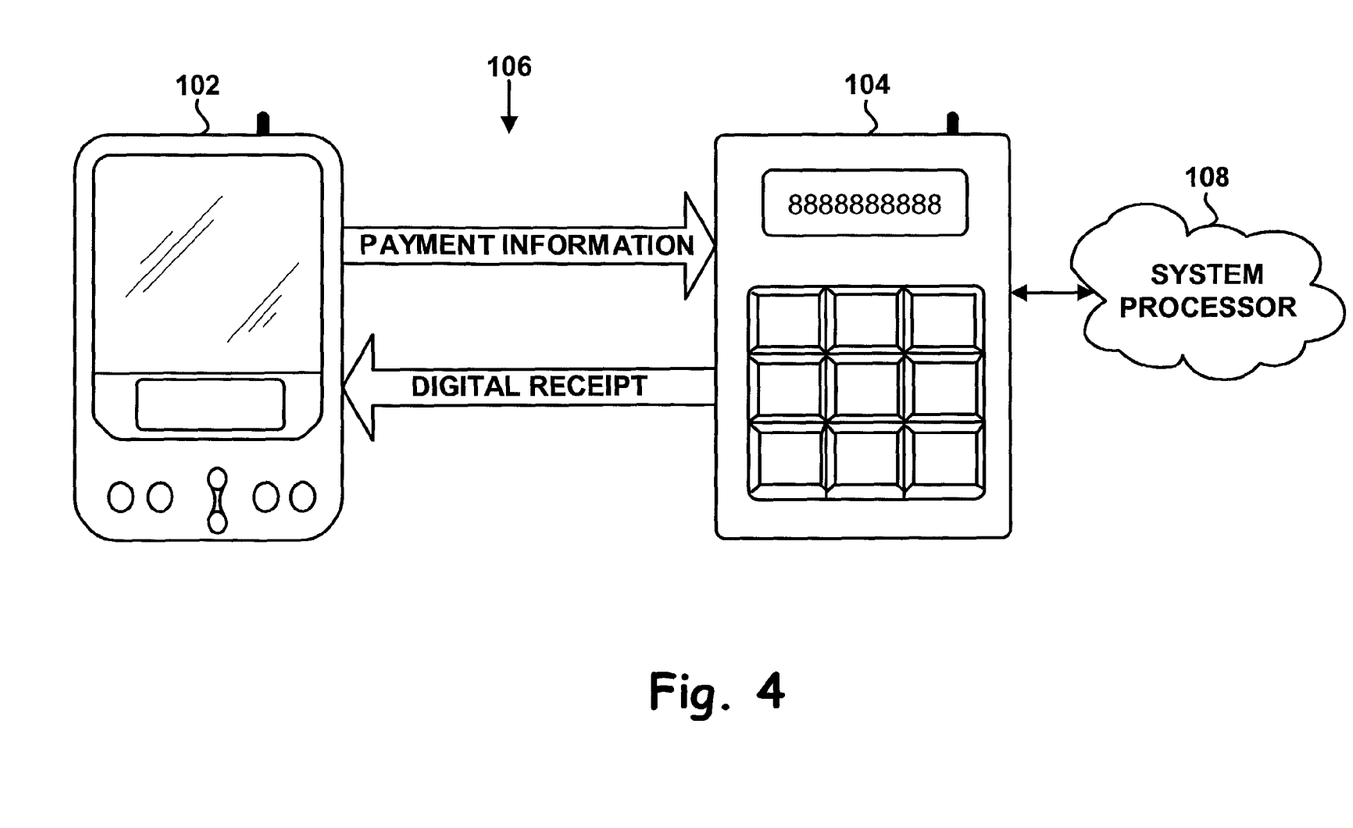
FIG. 4 illustrates a communication flow of the wireless electronic system depicted in FIG. 1, according to another embodiment.

FIG. 4 illustrates a general communication flow of the wireless electronic system 100 as shown in FIG. 1 for a routine purchase. Additional communication may occur between the user device 102 and the payment device 104 that is not depicted in FIG. 4. For this example, the user makes a routine purchase. The routine purchase may include any purchase that the user makes repeatedly, such as a bus fare needed to get to and from work.

The user presents his or her user device 102 to the payment device 104. The payment device 104 may be located at a store, transportation center, point of entry, or any other location in which a purchase may be completed. The point of entry may be any entrance at which a payment is required, such as the entrance to a bus, theater, park, museum, or parking lot. Upon presentation, the user device 102 may negotiate and set up the secure wireless network 106 with the payment device 104.

When the wireless network 106 has been setup, the user device 102 may transfer payment information to the payment device 104. The payment information may include account information needed to perform and complete the transaction. For example, the payment information may include, but is not limited to, user identification and billing address, service institution identification (Visa, MasterCard, bank), account number, expiration date, and credit limit.

The user device 102 may transfer the payment information to the payment device 104 automatically. The user device may also transfer user information, such as user identification, address, telephone number, and age. For example, the amount of the purchase may be dependant on the age of the user. The user device 102 may be preauthorized to make the routine purchase. The payment information may be transferred from the user device 102 to the payment device 104 remotely. This may reduce the purchase time by limiting the requirement to stand in a line.

The payment device 104 may forward some or all of the payment information to the system processor 108. The system processor 108 may verify the payment information. The system processor 108 may then provide the payment device 104 with a message that indicates whether or not the purchase is authorized. Alternatively, the payment device 104 may be capable of authorizing the purchase without the use of the system processor 108.

If the purchase is authorized, the payment device 104 may send the user device 102 the digital receipt indicating that the transaction is complete. The digital receipt may be transferred from the payment device 104 to the user device 102 remotely. When the transaction is complete, either the user device 102 or the payment device 104 may terminate communication over the wireless network 106.

Figure 5:
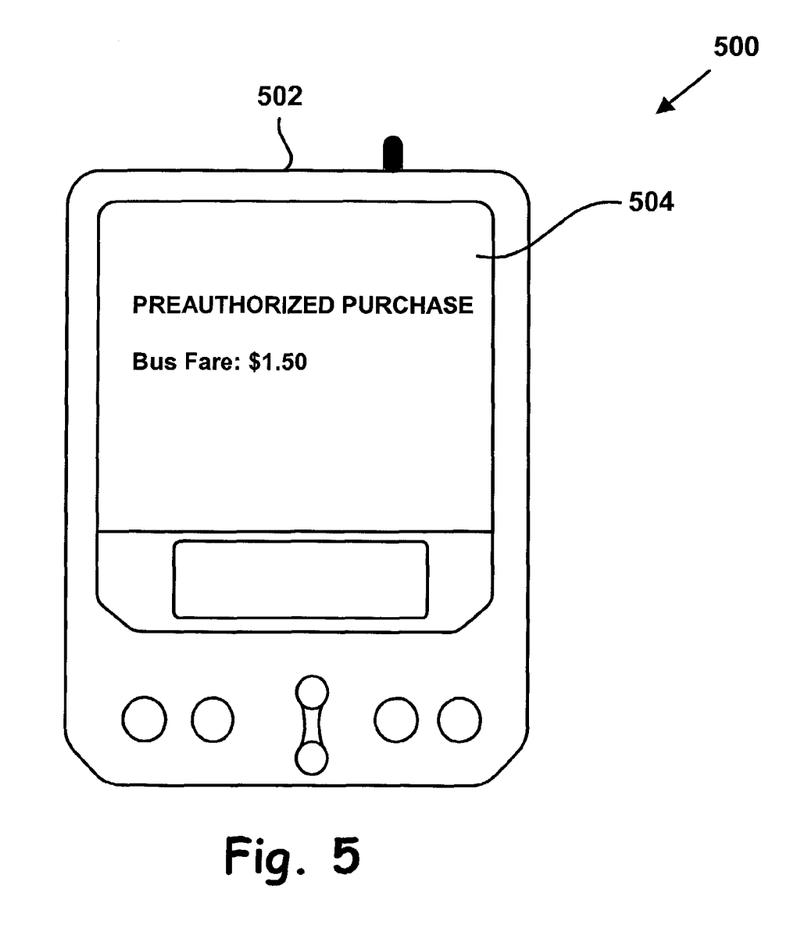
FIG. 5 illustrates a screen shot of a routine purchase, according to another embodiment.

FIG. 5 illustrates a screen shot 500 of a routine purchase. The screen shot 500 may be displayed on a user device 502. The user device 502 may be substantially the same as the user device 102 of the wireless electronic system 100. A routine purchase 504 may be located on the display of the user device 502. The routine purchase 504 depicted on the screen shot 500 is provided as an example only. The routine purchase 504 may include text and/or graphics that communicate the purchase details. The user device 502 may be preauthorized to complete the routine purchase, reducing the purchase time. The routine purchase 504 may be stored in memory on the user device 502.

Obvious Purchase

Referring back to FIG. 4, a general communication flow of the wireless electronic system 100 as shown in FIG. 1 for an obvious purchase is illustrated. The obvious purchase may include any purchase that may be inferred based upon the location of the user, the identity of the user, and the detection of a point of entry. Other factors may also be used to classify the purchase as obvious.

The user presents his or her user device 102 to the payment device 104. The payment device 104 may be located at the point of entry. Upon presentation, the user device 102 may negotiate and set up the secure wireless network 106 with the payment device 104. When the wireless network 106 has been setup, the user device 102 may transfer payment information to the payment device 104. The payment information may include account information needed to perform and complete the transaction. For example, the payment information may include, but is not limited to, user identification and billing address, service institution identification (Visa, MasterCard, bank), account number, expiration date, and credit limit.

The user device 102 may transfer the payment information to the payment device 104 automatically. The user device 102 may also transfer user information, such as age. For example, the purchase may be dependant on the age of the user. The user device 102 may be preauthorized to make the obvious purchase. The user may preauthorize an obvious purchase based on a multitude of factors, such as price. For example, the user device 102 may be preauthorized to make obvious purchases less than $20. The payment information may be transferred from the user device 102 to the payment device 104 remotely. This may reduce the purchase time by limiting the requirement to stand in a line.

Alternatively, the user device 102 may prompt the user for an input. The input may include authorization, identification of the number of purchases to be made, the selection of a movie, or any other choice that the user may have at the time of purchase.

The payment device 104 may forward some or all of the payment information to the system processor 108. The system processor 108 may verify the payment information. The system processor 108 may then provide the payment device 104 with a message that indicates whether or not the purchase is authorized. Alternatively, the payment device 104 may be capable of authorizing the purchase without the use of the system processor 108.

If the purchase is authorized, the payment device 104 may send the user device 102 the digital receipt indicating that the transaction is complete. The digital receipt may be transferred from the payment device 104 to the user device 102 remotely. When the transaction is complete, either the user device 102 or the payment device 104 may terminate communication over the wireless network 106.

In another embodiment, the user may subscribe to a system that tracks the movements of the user device 102. The system may track the user device 102 using a global positioning system (GPS). Other tracking systems may also be employed. The tracking system may validate the payment of the obvious purchase automatically, thereby reducing the time it takes to complete the purchase. The tracking system may then bill the user periodically. For example, the user carrying his or her user device 102 may drive to work in the morning and park his or her car in a parking lot (parking fee=$10.00), go to a park at lunch (entrance fee=$5.00), and then go to the movies after work (ticket=$10.00). The tracking system tracks the user device 102 during the day and then bills the user $25.00 for the purchases completed that day.

Figure 6:
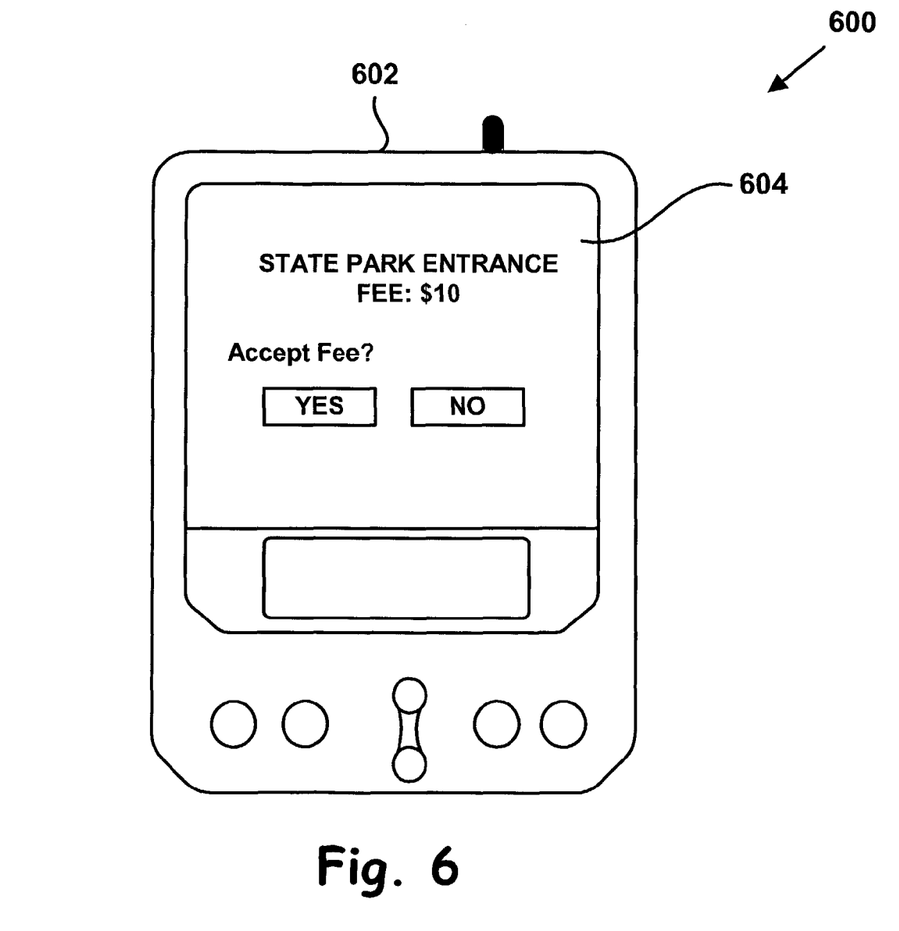
FIG. 6 illustrates a screen shot of an obvious purchase, according to another embodiment.

FIG. 6 illustrates a screen shot 600 of an obvious purchase. The screen shot 600 may be displayed on a user device 602. The user device 602 may be substantially the same as the user device 102 of the wireless electronic system 100. An obvious purchase 604 may be located on the display of the user device 602. The obvious purchase 604 depicted on the screen shot 600 is provided as an example only. The obvious purchase 604 may include text and/or graphics that communicate the purchase details and/or requested user input. The obvious purchase 604 may be stored in memory on the user device 602.

The user device 602 may be preauthorized to complete the obvious purchase. However, the user device 602 may request additional input from the user prior to completing the purchase as seen in FIG. 6. The additional input may allow the user to authorize the purchase or to make a selection of alternatives. For example, if the user is entering a park with a set entrance fee, the user device 602 may be preauthorized to pay the fee. However, the user may not preauthorize the user device 602 to complete obvious purchases and require user authorization prior to completing the purchase. In another example, the user may have to select which movie to attend on the user device 602 while entering a movie theater.

It should be understood that the illustrated embodiments are exemplary only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A method, comprising in combination:
   transferring, without purchase, a purchase token to a user device, the purchase token based on information from a previous purchase stored by the user device, with details regarding the previous purchase stored on the user device;
   storing the purchase token on the user device; and
   redeeming the purchase token to complete a purchase.

2. The method of claim 1, further comprising authenticating the purchase token.

3. The method of claim 2, wherein authentication is performed using an electronic signature.

4. The method of claim 2, wherein authentication is performed using an encryption system.

5. The method of claim 1, wherein the purchase token contains purchase details needed to complete the purchase.

6. The method of claim 5, wherein the purchase details include details selected from the group consisting of item description, item price, and store information.

7. The method of claim 1, wherein the purchase token contains an expiration date.

8. The method of claim 7, wherein the purchase token sets a maximum price for a selected item until the expiration date.

9. The method of claim 8, comprising redeeming the purchase token on or before the expiration date at a price less than or equal to the maximum price.

10. The method of claim 7, wherein the purchase token reserves a selected item until the expiration date.

11. The method of claim 1, wherein a merchant receives credit for a sale when the purchase token is transferred.

12. The method of claim 1, wherein a payment device transfers the purchase token to the user device.

13. The method of claim 1, wherein a Web page transfers the purchase token to the user device.

14. The method of claim 1, wherein the purchase token is redeemed at a store.

15. The method of claim 1, wherein the purchase token is redeemed on a Web page.

16. The method of claim 1, further comprising transferring payment information to a payment device.

17. The method of claim 16, wherein the payment information includes account information needed to complete the purchase.

18. The method of claim 1, wherein the user device is an electronic device selected from the group consisting of personal digital assistant, mobile phone, pager, and handheld device.

19. The method of claim 1, wherein the user device is a personal digital assistant.

* * * * *